United States Patent [19]

Lybarger et al.

[11] 4,090,563

[45] May 23, 1978

[54] INCREASING THE CLAY DISSOLVING CAPABILITY OF A BUFFER-REGULATED MUD ACID

[75] Inventors: James H. Lybarger; Edwin A. Richardson; Ronald F. Scheuerman; Charles C. Templeton, all of Houston, Tex.

[73] Assignee: Shell Oil Company, Houston, Tex.

[21] Appl. No.: 754,143

[22] Filed: Dec. 27, 1976

[51] Int. Cl.$^2$ .............................................. E21B 43/27
[52] U.S. Cl. ................................. 166/307; 252/8.55 C
[58] Field of Search ................... 252/8.55 C; 166/307, 166/282

[56] References Cited

U.S. PATENT DOCUMENTS

| | | | |
|---|---|---|---|
| 2,803,306 | 8/1957 | Hower | 166/282 |
| 2,877,848 | 3/1959 | Case | 252/8.55 X |
| 3,481,404 | 12/1969 | Gidley | 166/307 |
| 3,543,856 | 12/1970 | Knox et al. | 166/307 |
| 3,797,575 | 3/1974 | Dill et al. | 166/282 |
| 3,826,312 | 7/1974 | Richardson et al. | 252/8.55 X |
| 3,828,854 | 8/1974 | Templeton et al. | 166/307 |
| 3,889,753 | 6/1975 | Richardson | 252/8.55 X |

*Primary Examiner*—Herbert B. Guynn

[57] ABSTRACT

The clay dissolving capability of an aqueous mud acid solution of weak acid, weak acid salt and fluoride salt (of the type described in the E. A. Richardson U.S. Pat. No. 3,889,753) can be increased by including in the solution a partial salt of an aminopolyacetic acid chelating or complex-forming agent.

7 Claims, 1 Drawing Figure

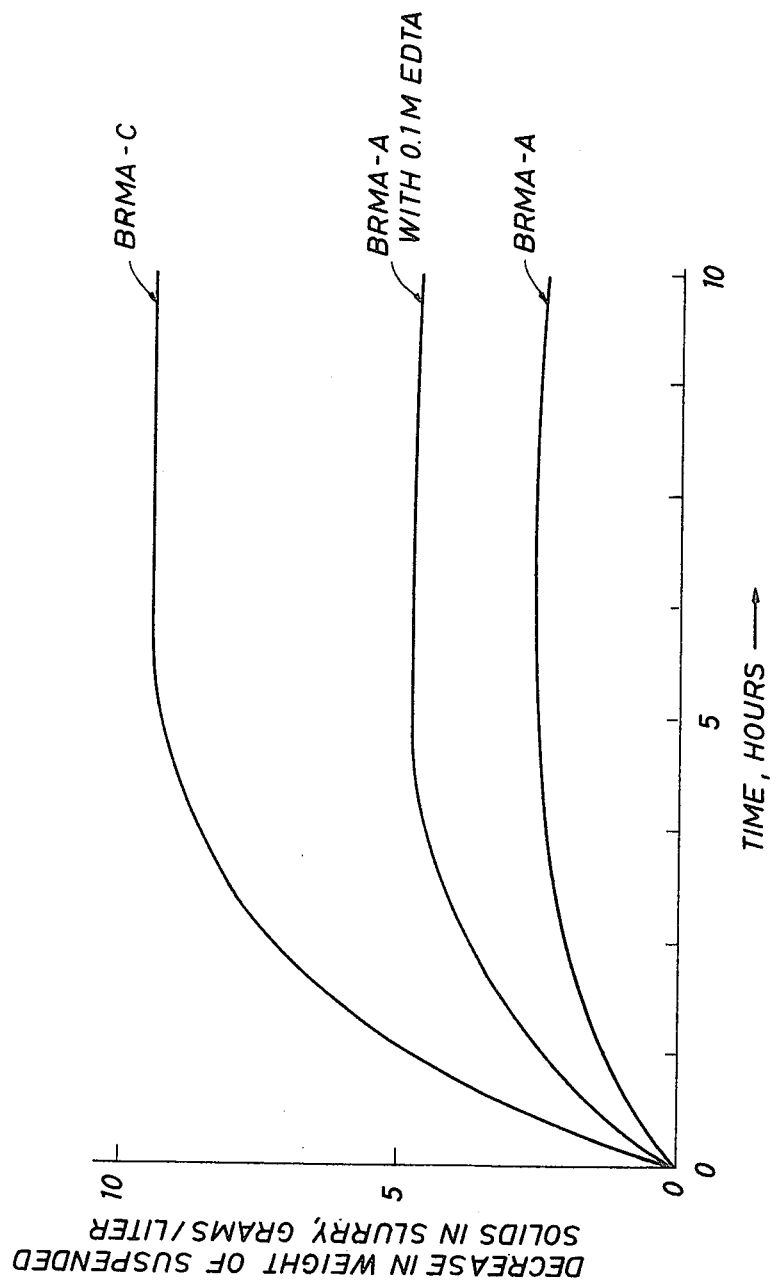

INCREASING THE CLAY DISSOLVING CAPABILITY OF A BUFFER-REGULATED MUD ACID

BACKGROUND OF THE INVENTION

This invention relates to a well-treating process for dissolving a siliceous material within a well borehole or a subterranean earth formation. More particularly, it relates to increasing the amount of siliceous material which can be dissolved by an aqueous mud acid solution of weak acid, weak acid salt and fluoride salt of the type described in the E. A. Richardson U.S. Pat. No. 3,889,753. That patent and/or the invention it describes is referred to herein as the U.S. Pat. No. 3,889,753 and its disclosures are incorporated herein by cross-reference.

In accordance with U.S. Pat. No. 3,889,753, a siliceous material is reacted relatively slowly with an aqueous hydrogen fluoride-containing acid by contacting the siliceous material with an aqueous solution of a fluoride salt, a weak acid and a weak acid salt in proportions providing a significant but low concentration of dissolved hydrogen fluoride. The concentrations are preferably correlated to provide a fluoride salt concentration equivalent to at least a clay-dissolving concentration of hydrogen fluoride, enough weak acid to convert at least an effective amount of the fluoride salt to hydrogen fluoride, and enough weak acid salt to provide a ratio of weak acid to weak acid salt that limits the rate of the acidization reaction.

The rates at which the mud acid solutions of U.S. Pat. No. 3,889,753 react with acid-reactive materials are kept low by limiting the concentration of hydrogen fluoride and ionized weak acid in those solutions. The limiting is provided by the buffering action of the mixtures of weak acids and weak acid salts that are dissolved in the solutions.

In an aqueous solution a weak acid ionizes to provide proportions of unionized weak acid, hydronium ions, and weak acid anions that satisfy the ionization constant for the acid. The reaction is an equilibrium reaction. If such a solution also contains the salt of a weak acid, the salt ionizes to yield additional weak acid anions, and that reduces the proportion of hydronium ions that are needed to satisfy the ionization constant for the acid.

In the mud acid solutions of U.S. Pat. No. 3,889,753, an adequate supply of fluroide anions is provided by the ionization of the dissolved fluoride salt. But, since the formation of a molecule of hydrogen fluoride requires a combination of a hydronium ion and a fluoride anion, and since the concentration of hydronium ions is kept low by the buffering action, the concentration of hydrogen fluoride is also kept low. They are both regulated by the buffering action of the weak acid and weak acid salt. In acidizing a siliceous material, the low concentration of hydrogen fluoride molecules severely limits the rate at which those molecules (of which a relatively few are distributed throughout the total volume of the solution) can come into contact with the siliceous material.

The buffer-regulated mud acids of U.S. Pat. No. 3,889,753 are adapted to have a relatively high pH at which they are uniquely insensitive to the presence of carbonate minerals. It is known that when a conventional mud acid is to be used where carbonate minerals are apt to be encountered, a pretreatment with an acid that is free of hydrogen fluoride is necessary. A conventional mud acid tends to release calcium ions (or the ions of other alkaline earth metals) from the carbonate minerals so that such ions react with hydrogen fluoride and form insoluble precipitates. But, since the mud acids of U.S. Pat. No. 3,889,753 can be buffer-regulated at a pH that is high enough to severely limit the rate of their reaction with carbonate minerals, they are substantially immune to such undesirable calcium ion induced-precipitation, with little or no pretreatment acid that is free of hydrogen fluoride.

SUMMARY OF THE INVENTION

The present invention relates to improving a well-treating process in which an aqueous solution which contains a weak acid, a weak acid salt and a fluoride salt and is capable of dissolving clay is flowed into contact with a siliceous material to be dissolved. The siliceous material dissolving-capability of the solution is increased by including within the solution an aminopolyacetic acid salt chelating or complex-forming agent.

DESCRIPTION OF THE DRAWING

The drawing shows a plot of the decrease with time in the amount of clay solids suspended in various aqueous mud acid solutions.

DESCRIPTION OF THE INVENTION

The present invention is, at least in part, premised on the following discovery. In an aqueous mud acid solution of weak acid, weak acid salt and fluoride salt, the inclusion of an aminopolyacetic acid salt chelating agent provides an unobviously beneficial result. In accordance with the teachings of the prior art, the chelating agents which were previously incorporated in reservoir acidizing solutions were those which were soluble in strong acids and were thus capable of preventing the precipitation of hydroxides of multivalent metals when the pH of the spent acidizing solution increases to a pH of about 3 or more (which normally causes the precipitation of such hydroxides). For example, U.S. Pat. No. 2,175,095 suggests including citric acid or the like to prevent the precipitating of iron or aluminum hydrates at the pH at which they are normally precipitate. U.S. Pat. No. 2,335,689 suggests similar inclusions of polyhydric phenols. U.S. Pat. No. 3,142,335 suggests similar uses of mixtures of citric acid or its salts with acetic or formic acid or their salts, to buffer the pH at a value low enough to keep the hydroxides in solution. U.S. Pat. No. 3,150,081 suggests similar uses of mixtures of hydroxyacetic acid and citric acid, which mixtures are said to be cheaper and more effective than either of the acids by themselves.

However, due to the relatively high pH exhibited by a mud acid solution of weak acid, weak acid salt and fluoride salt of U.S. Pat. No. 3,889,753, it tends to avoid any such precipitations of hydroxides of polyvalent metals. The high pH at which those solutions effect the dissolving of siliceous materials tends to prevent the dissolving of the polyvalent metals, with no chelating agents being needed to prevent the precipitating of the hydroxides of polyvalent metals.

Although the chelating capabilities of aminopolyacetic acid salts are well known, the acids from which those salts are formed are substantially insoluble in relatively strong acid solutions, which have pH's below about 3. Therefore, the aminopolyacetic acid salt chelating agents were previously thought to be undesirable for use in reservoir acidizing solutions.

We have now discovered that (a) the aminopolyacetic acid salt chelating agents are capable of dissolving in and functioning as chelating or complex-forming agents in aqueous mud acid solutions of weak acids, weak acid salts and fluoride salts having pH's of from about 3 to 6, and (b) when such an aqueous mud acid solution contains an effective amount of an aminopolyacetic acid salt, it becomes capable of dissolving significantly more siliceous material than a similar acid solution free of that salt.

In view of this, it appears that, in the presence of excess clay or other siliceous material, the aqueous mud acids of the 753 patent tend to reach an equilibrium with respect to dissolving solid siliceous materials. The solid products, as identified by x-ray diffraction, include:

$(NH_4)_2SiF_6$, $(NH_4)_3AlF_6$, $NH_4MgAlF_6$, $CaF_2$, and $MgF_2$.

It thus appears that the complexing of the cations, $Al^{3+}$, $Mg^{2+}$, and $Ca^{2+}$, in a soluble form with an aminopolyacetic acid salt may be a factor in causing the increase in the net dissolved solids.

And, consistent with such a possible mechanism, we have also discovered that, when an aqueous mud acid solution of weak acid, weak acid salt and fluoride salt contains a weak acid (and/or weak acid salt), of an acid, such as citric acid, which is itself capable of functioning as a chelating or complex-forming agent, the siliceous material-dissolving capability of the solution is greater than that of an otherwise equivalent solution which is free of weak acids (or weak acid salts) that are capable of functioning as complexing agents.

The aqueous liquid used in the present buffer regulated mud acids can be pure water or substantially any relatively dilute aqueous liquid that is compatible with fluoride salts, weak acids, weak acid salts, and the acidification reaction products of hydrogen fluoride and siliceous materials. Such aqueous liquids can advantageously contain additives such as corrosion inhibitors, wetting agents, detergents, oil solvents, oil and water mutual solvents, water-thickening agents, suspended particles (such as fracture propping particles, or sand or gravel pack-forming particles) and can contain additives such as those conventionally utilized in forming and/or acidizing fractures or sand packs, or gravel packs, or the like. Preferably the aqueous liquids comprise water or relatively dilute and soft saline solutions. Such solutions in which any dissolved salts consist essentially of ammonium salts are particularly preferred.

Fluoride salts suitable for use in the present invention comprise substantially any relatively water soluble ammonium fluoride salts which are at least substantially free of any cations other than ammonium ions. The concentration of cations other than ammonium ions should be low relative to the tendency for such cations to form insoluble fluosilicates. Ammonium fluoride and ammonium bifluoride are particularly suitable. Where ammonium bifluoride is used, it is preferable to add sufficient ammonia or ammonium hydroxide to provide substantially equivalent proportions of ammonium and fluoride ions.

Weak acids suitable for use in the present invention comprise substantially any that dissolve in water to form an acidic solution adapted to convert fluoride anions to hydrogen fluoride. Examples of suitable weak acids include: water soluble fatty acids such as formic acid, acetic acid, and the like; substituted water soluble organic acids such as chloroacetic acid, hydroxyacetic acid, and the like; various water soluble polycarboxylic acids such as citric acid, and the like. The weak acids can be used in the form of individual acids or mixtures of acids. Particularly suitable weak acids are formic acid, acetic acid, and citric acid.

Weak acid salts suitable for use in the invention comprise water soluble salts of the weak acids of the type described above which salts are at least substantially free of cations other than ammonium ions. Examples of suitable weak acid salts include the ammonium salts of such acids, such as ammonium formate, ammonium acetate, ammonium citrate, etc. The weak acid salts can be used as individual salts or as mixtures of salts. The salt of a given weak acid can be used with that weak acid or with one or more different weak acids. For example, a relatively small proportion of a weak acid salt that is adapted to provide a realtively high pH when it is dissolved in an aqueous solution along with a given weak acid can be used along with a salt of a different weak acid so that, due to the mixture of weak acid salts, the pH is initially kept at a higher value than that which is later maintained. Particularly suitable weak acid salts includes the ammonium acetates, formates or citrates.

Where it is desirable to provide a buffer regulated mud acid solution that causes an initially rapid and/or extensive acidization of a siliceous material (or other acid-reactive material) a portion of strong acid can be dissolved in the solution. As long as the strong acid is present, it overrides the buffering action and depresses the pH of the solution. As soon as the strong acid is depleted, the pH rises and the rate of acidization decreases and becomes the relatively low rate established by the buffering action. In the present process, such a strong acid-containing solution is preferably injected as a pretreatment slug ahead of a solution containing the polyaminoacetic acid salt.

In making up, or compounding, the present acid solutions, the reactants can be mixed in substantially any order and/or formed within the aqueous solution. For example, in preparing a buffer-regulated mud acid containing ammonium fluoride, acetic acid and ammonium acetate, the solution can be formed by mixing an aqueous liquid with ammonium fluoride and/or ammonium bifluoride or acetic acid and/or acetic anhydride, in any order, and then adding enough ammonia of ammonium hydroxide to provide a concentration of ammonium ions exceeding the concentration of fluoride ions by an amount corresponding to a selected ratio of acetic acid to ammonium acetate. The components of the present acid solutions can be mixed at a surface location near the wall, within the conduits in a well, or can be mixed at a location remote from the well from which location the buffer-regulated acid solutions are transported to the well by means of containers and/or pipelines that are free of materials that are reactive with hydrogen fluoride or a weak acid.

The concentrations of the components of the present buffer-regulated mud acids can vary over relatively wide ranges. It is generally desirable that the concentration of the fluoride salt be equivalent to at least about 0.1 molar hydrogen fluoride solution (with concentrations equivalent to from about 1 to 2 moles per liter of hydrogen fluoride being preferred). If desired, the amount of siliceous material to be acidized by a given volume of a buffer regulated acid solution can be increased by using a relatively high concentration of fluoride salt and sufficient weak acid to convert it to hydrogen fluoride. However, where a relatively large amount of siliceous material is to be acidized, it is generally preferable to contact the material with a buffer-regulated mud acid containing a preferred concentration of the essential components and to keep contacting it with successive portions of the solution (in batches or continuously) to the extent required to acidize the desired amount of the material.

In the present solutions, the concentration of the weak acid is preferably at least sufficient to convert the dissolved fluoride salt to a concentration of hydrogen fluoride that is effective for acidizing a siliceous material, e.g., to provide a hydrogen fluoride concentration of at least about 0.1 moles per liter. The concentration of weak acid can be greater; for example, to provide a relatively low pH and relatively high rate of reaction and/or capacity for acidizing a weak acid-reactive material per volume of solution. In formulating the present buffer-regulated mud acids, the types and concentrations of the weak acid and weak acid salt can be adjusted relatively to each other to provide a selected pH (and rate of acidization reaction). For a given weak acid and weak acid salt, the pH is inversely proportional to, and is primarily dependent upon the molar ratio of the acid to the salt. For a given weak acid and a given ratio of weak acid to weak acid salt, the pH can be varied by varying the composition of the salt; for example, by using a salt of an exceptionally weak acid to provide a relatively high pH, or using the salt of a nominally weak acid to provide a lower pH, or the like. In general, the amount of siliceous material that can be acidized by a given volume of the solution is determined primarily by the concentration of the mixture of fluoride salt and weak acid. The rate at which such an acidization can occur is controlled primarily by the ratio of the concentrations of the weak acid and the weak acid salt.

In general, substantially any aminopolyacetic acid chelating or complexing agent, which salt is at least substantially free of any cations other than ammonium, can be used. Those which are at least substantially analogous to EDTA (ethylenediamine tetraacetic acid) with respect to the solubility of their polyvalent metal-chelant complexes are preferred. Examples of such chelating agents include such ammonium salts of ethylenediamine tetraacetic acid, N-hydroxyethylamino diacetic acid, diethylenetriamine pentaacetic acid, nitrilo triacetic acid, and the like. Such salts of ethylenediamine tetraacetic acid (EDTA) are preferred, and can be formed in situ by dissolving the acid in an ammonium hydroxide-containing aqueous solution.

The drawing shows the results of tests of the clay dissolving capability of various aqueous mud acid solutions of weak acid, weak acid salt and fluoride salt. In each case sodium bentonite was suspended in the acid in a concentration of 25 grams per liter, and the suspension was maintained at 158° F. The amount bentonite dissolved was measured by measuring the decrease in weight of the suspended solids. The amounts in grams per liter, were plotted against the reaction times in hours. The curve designated "BRMA-A" relates to an aqueous mud acid solution of 2M acetic acid, 1M ammonium acetate, and 1M ammonium fluoride. The curve marked "BRMA-A with 0.1M EDTA" relates to the same acid containing 0.1 mole per liter of ethylenediamine tetraacetic acid (in the form of its partial ammonium salt). The curve marked "BRMA-C" relates to an aqueous mud acid solution of 2 normal citric acid, 1M ammonium citrate, and 1M ammonium fluoride. As indicated by the plot, the acids containing the complexing agents dissolved significantly more clay. The solution containing the citric acid and citrate salts in concentrations providing substantially 3 moles per liter of complexing agent, dissolved significantly more clay than the one containing 0.1M EDTA.

In general, the siliceous material dissolving-capability of an aqueous mud acid solution of weak acid, weak acid salt and fluoride salt increases with increasing concentration of chelating agent. Significant increases are provided by concentrations of aminopolyacetic acid salt chelating agents as small as about 0.01 moles per liter. In such acid solutions having a pH of from about 4 to 6 (typified by one containing 2M acetic acid, 1M ammonium acetate, and 1M ammonium fluoride) a concentration of from about 0.05 to 0.3 moles per liter of an aminopolyacetic acid salt complexing agent having a complexing capability substantially equivalent to that of an ethylenediamine tetraacetic acid salt, is preferred. Note that such a complexing agent can also be used as some or all of the weak acid salt component of the buffer regulating system, in which case the concentration of the complexing agent should be from about 0.5 to 1.0 moles per liter.

In the present process the aminopolyacetic acid salts can be used in combination with coupling agents (such as citric acid) which are capable as functioning as both the weak acid and/or weak acid salt component of an aqueous mud acid solution of weak acid, weak acid salt and fluoride salt. Although, as indicated by the drawing, the clay dissolving capability of such systems containing relatively high concentrations of complex-forming acids, such as citric acid, can be high. The cost of such acids can make the chemical cost of the acidizing fluid undesirably high. In numerous situations a desirably high siliceous material dissolving capability can be obtained without such a high cost by (a) replacing a significant portion of the complex-forming weak acid with a less expensive weak acid, and (b) enhancing the clay dissolving capability of the solution of the less expensive acid by including an effective amount of aminopolyacetic acid salt.

Where components within the well (and/or the subterranean reservoir) to be treated may contain alkaline earth metal ions, a preferred procedure for employing the present process, includes a pretreatment. The present chelating complexing agent containing mud acid solution is preferably preceded by an injection of a slug of aqueous ammonium chloride solution (preferably having a concentration of about 0.1 to 1.0 moles per liter) or such an ammonium chloride solution preceded by a slug of an aqueous sodium or potassium chloride solution (preferably having a concentration of from about 0.1 to 1.0 moles per liter). Such pretreatments ensure that substantially all of the ions dissolved in aqueous fluids or adsorbed on clays within the region to be treated are ammonium ions.

The acidizing solutions of the present invention have been found to be uniquely valuable for use in stimulating deep, hot, sour gas wells such as those in the Piney Woods Field in Mississippi. Laboratory bottle and flow tests were made on cores from a Norphlet formation at 350° F under a simulated overburden pressure of 300–500 psi. This simulated the reservoir temperature (but not the pressure, which was over 20,000 psi). It was found that an aqueous mud acid solution containing 2M acetic, 1M ammonium acetate, and 1M ammonium fluoride, and 0.1M EDTA were (1) more effective in increasing permeability than a 12% formic acid solution, and (2) were much less corrosive than the formic solution (having a pH of 1.7). The reactivity of a hydrochloric acid solution is too high to be useful at that temperature and even a formic acid solution requires inhibitors, for general corrosion, and sulfide and chloride stress cracking corrosion when used in presence of the fluids produced from those reservoirs.

A field test was conducted by treating a well in Mississippi which is completed in a tight Norphlet sand reservoir containing sour gas at depths of more than 21,000 feet. The bottom hole temperatures exceed 365° F. An 8-stage treatment was conducted with a total of 420 barrels of acid injected, each stage consisted of a preflush, a diverter (not included for the first acid stage), an acid treatment and an overflush. After the treatment, the well stabilized at a production rate of 1.4 MMCF/d, which was about 30% higher than that before stimulation.

The well was prepared by circulating 280 barrels of inhibited diesel oil down the tubing string while taking returns from the annulus. This displaced substantially all of the gas from the tubing and annulus, to enhance the accuracy of monitoring the downhole pressures by measuring surface pressures. With the exception of the diverter slugs, all of the injected fluids were pumpted through Halliburton Pico-type filters containing special 2-micron polyproplene filters. The treatment included the following steps:

(b 1) a preflush with 3% aqueous ammonium acetate containing 0.1M partially neutralized EDTA;

(2) a short-time treatment (approximately 20–30 minutes) with a buffer-regulated mud acid containing acetic acid, ammonium acetate, ammonium fluoride, and an ammonium partial salt of EDTA; and (3) an overflush with the preflush solution.

The fluids used in the treatment are summarized in Table 1.

TABLE 1
TREATMENT FLUID COMPOSITION

| Fluid Composition | Abbreviation | Bbls. Pumped |
|---|---|---|
| Xylene | Xylene | 60 |
| Diesel Plus 0.5% KP-111 | Diesel | 70 |
| Ammonium Acetate - EDTA<br>0.39 M* ammonium acetate<br>0.1 M(NH$_4$)$_{2.5}$ EDTA** | AMA | 265 |
| BRMA-A***<br>1.0 M acetic acid<br>1.0 M ammonium acetate<br>1.0 M ammonium fluoride<br>0.1 M (NH$_4$)$_{2.5}$ EDTA | BRMA-A | 420 |
| Anthracene Diverter<br>"fish scale" type | Anthracene | 300 lbs |

*M = moles/l
**Partially neutralized EDTA
***Mixed final composition, not ingredients recipe Prior to the preflush treatment, fluids in the tubing string and annulus were circulated to spot 30 barrels of xylene in the annulus, immediately above the performations. During the treatment, substantially all of the fluids were pumped at a constant rate of about 2 barrels per minute. The pressure changes at the surface in response to the diverter were in the range of 40–90 psi. The well took the treatment fluids at an average differential of 1680 psi above shut-in pressure. No pressure anomalies occurred during displacements of the fluids. Immediately following the treatment, 30 barrels of inhibited diesel oil was circulated down the annulus to displace the xylene in the annulus down into the perforated interval, to speed up the dissolving of the anthracene diverter. The well was unloaded on a small choke, with a drawdown of approximately 7500 psi, for the first several days.

What is claimed is:

1. In a well treating process which comprises:
    flowing fluid into a well to contact a siliceous material to be acidized in or around the bore hole of the well; the steps comprising
    compounding, for use as said fluid flowing into the well, a substantially pure water solution of solutes consisting essentially of an ammonium fluoride salt, a weak acid selected from the group consisting of water soluble fatty acids, chloroacetic acid, hydroxy acetic acid and citric acid and an ammonium salt of said weak acid in proportions providing within the solution, when the solution flows into the well and into contact with a siliceous material, (a) a fluoride salt concentration equivalent to at least a clay-dissolving proportion of hydrogen fluoride, (b) a weak acid concentration sufficient to convert at least an effective amount of fluoride salt to hydrogen fluoride, and (c) a total weak acid salt concentration sufficient to provide a ratio of weak acid to weak acid salt that yields a pH of from about 3 to 6 and limits the rate of the acidizing reaction;
    also, dissolving in said solution an amount of from about 0.05 to 0.3 moles per liter of an ammonium salt of ethylene diaminetetraacetic acid that is effective for increasing the amount of clay dissolved by the solution; and
    flowing the compounded fluid into the well.

2. The process of claim 1 in which some but not all of the weak acid or weak acid salt contained in the aqueous weak acid solution is citric acid or a citrate salt.

3. The process of claim 1 in which the flowing of the fluid into contact with the siliceous material is preceded by contacting that material an aqueous solution of ammonium chloride and a salt of ethylenediamine tetraacetic acid.

4. The process of claim 3 in which the reservoir temperature is at least about 350° F.

5. The process of claim 4 in which the weak acid is acetic acid and the weak acid salt is ammonium acetate.

6. The process of claim 5 in which anthracene particles effective as a diverting agent are incorporated in at least one portion of the fluid.

7. The process of claim 6 in which xylene is subsequently displaced into the treatment zone to speed up the dissolving of the anthracene particles.

* * * * *